United States Patent [19]

Dunmead et al.

[11] Patent Number: 6,007,598

[45] Date of Patent: Dec. 28, 1999

[54] METALLIC-CARBIDE-GROUP VIII METAL POWDER AND PREPARATION METHODS THEREOF

[75] Inventors: Stephen D. Dunmead, Midland; Michael J. Romanowski, Clio, both of Mich.

[73] Assignee: OMG Americas, Inc., Cleveland, Ohio

[21] Appl. No.: 09/006,596

[22] Filed: Jan. 13, 1998

Related U.S. Application Data

[62] Division of application No. 08/657,988, Jun. 4, 1996, Pat. No. 5,746,803.

[51] Int. Cl.$^6$ .................................................. C22C 29/08
[52] U.S. Cl. ............................... 75/236; 75/240; 75/246; 75/252
[58] Field of Search ............................ 75/239, 240, 246, 75/252

[56] References Cited

U.S. PATENT DOCUMENTS

| | | | |
|---|---|---|---|
| 3,440,035 | 4/1969 | Iwase et al. ................................. | 75/0.5 |
| 3,713,789 | 1/1973 | Ramovist .................................... | 75/363 |
| 3,723,359 | 3/1973 | Borg et al. ................................. | 75/252 |
| 3,732,091 | 5/1973 | Paris et al. ................................. | 75/363 |
| 4,851,041 | 7/1989 | Polizzotti et al. .......................... | 75/240 |
| 5,230,729 | 7/1993 | McCandlish et al. ...................... | 75/351 |
| 5,380,688 | 1/1995 | Dunmead et al. .......................... | 423/440 |
| 5,567,662 | 10/1996 | Dunmead et al. ........................ | 423/440 |
| 5,584,907 | 12/1996 | Muhammed et al. ..................... | 75/351 |

OTHER PUBLICATIONS

Chemical Abstracts, 77:104923j, "Particle Size Control of Superhard Alloy Powders, "Jap. 19,300 (1971).

Chemical Ststracts, 72:46849y, "Preparation of Cobalt/ Tungsten Carbide Mixtures," Brit. 1,173,109 (1969).

Chemical Abstracts, 120:140792f, "Production of the ultra fine–composite powders of tungsten carbide–cobalt, . . . ," Korea, '94.

Fang, et al., "Study of Nanostructured WC–Co Composites," Proceedings of the 13th Inter. Plansee Seminar,(1993), vol. 3, Nanodyne Inc., pp. 625–637.

McCandlish, et al., "Control of Composition & Microstructure in the Co–W–C System Using Chemical Synthetic Techniques," *Solid State Ionics*, 32/33, (1989), pp. 795–801.

Takatsu, S., "A New Continuous Process for Production of WC–Co Mixed Powder by Rotary Kilns," *Powder Metallurgy International*, vol. 10, No. 1, pp. 13–15.

Whyte, et al., "Preparation of Nanophase WC–Co Composite Powders In A Fluidized Bed Reactor," AIChE Symposium Series, No. 289, vol. 88, pp. 116–121.

Ushijima, et al., "Production of WC Powder from $WO_3$ with Added $Co_3O_4$," *Japan Metal Society Journal*, 42, No. 9, pp. 871–875 (1978).

Ushijimi, et al., "Mechanism of WC Formation from WO3 with Added $Co_3O_4$ and C," *Japan Metal Society Journal*, 42, No. 9, pp. 876–881.

Primary Examiner—George Wyszomierski
Attorney, Agent, or Firm—Kalow Springut & Bressler

[57] ABSTRACT

A transition metal carbide-Group VIII metal powder comprising discrete particles of a transition metal carbide and Group VIII metal wherein: substantially all of the particles have a size of at most 0.4 micrometer; the transition metal carbide is selected from carbides of the group consisting of tungsten, titanium, tantalum, molybdenum, zirconium, hafnium, vanadium, niobium, chromium, mixtures and solid solutions thereof; and the Group VIII metal is selected from the group consisting of iron, cobalt, nickel, mixtures and solid solutions thereof. Said powders are produced by heating an admixture comprising a finishing source of carbon (e.g., acetylene black), a source of a group VIII metal (e.g., $Co_3O_4$), and a particulate precursor to a temperature of about 1173 K to about 1773 K for a time sufficient to form a transition metal carbide-Group VIII metal powder, wherein at least about 25% by weight of the carbide precursor is carburized in forming the transition metal carbide of the transition metal carbide-Group VIII metal powder. The particulate precursor generally contains less than 2.5% oxygen by weight and contains compounds which undergo carburization such as a transition metal (e.g., W), lower valence transition metal carbide ($W_2C$) to form the transition metal carbide (e.g., WC)-Group VIII metal powder.

5 Claims, No Drawings

6,007,598

METALLIC-CARBIDE-GROUP VIII METAL POWDER AND PREPARATION METHODS THEREOF

This application is a divisional application of U.S. patent application Ser. No. 08/657,988, filed Jun. 4, 1996, now U.S. Pat. No. 5,746,803, issued May 15, 1998, the contents of which are hereby incorporated into the present disclosure.

FIELD OF THE INVENTION

The invention relates to transition metal carbide-Group VIII metal powders and methods for preparing said powders. The invention relates, in particular, to tungsten carbide-cobalt powders.

BACKGROUND OF THE INVENTION

Metallic carbide powders are used to make densified or sintered products. For example, it is well-known that monotungsten carbide (WC) is useful in the manufacture of commercially worthwhile items such as cutting tools, tool dies, blast nozzles and drill bits. In producing said WC items, it is common for a tungsten carbide powder to be combined with a metal such as cobalt and, subsequently, densified into a WC/Co cemented carbide by heating when making said tools.

As the particle size of the metallic carbide-metal powder decreases, the densified products generally exhibit improved properties such as increased strength and improved wear resistance. However, due to their high surface energy, if the particles are too small they may cause exaggerated grain growth to occur when forming a cemented carbide part. Exaggerated grain growth adversely affects properties such as strength. Grain growth can be controlled to some extent by addition of grain growth inhibitors such as VC, $Cr_3C_2$, or TaC or by starting with a WC having a narrow size distribution.

Densified metallic carbide-metal products having improved properties (e.g., increased strength) are also generally achieved by homogeneously blending the metallic carbide and metal powders. Homogeneously blending the powders generally results in a more uniform microstructure resulting, in less defects such as large grains due to exaggerated grain growth and pores in the densified body.

Monotungsten carbide is typically formed by the carburization of metal tungsten. Metal tungsten carburization processes typically make WC powders having a particle size of about 0.8 micrometer and larger because of the difficulty in producing W metal much smaller than this size. Tungsten metal typically cannot be made much smaller than this size due to synthesis limitations and the tungsten powder being pyrophoric.

Methods which have attempted to make more homogeneously blended and smaller WC-cobalt powder (i.e., WC-cobalt mixed powder) include the following. The article, "Production of WC Powder from $WO_3$ with Added $Co_3O_4$," by Ushijima, et al., published in the *Japan Metal Society Journal*, 42, No. 9, pages 871–875 (1978), describes a method to produce WC-cobalt powder by carbothermal reduction of $WO_3$ and $Co_3O_4$ in the presence of carbon in the form of carbon black and hydrogen. The WC-cobalt mixed powder formed by this method had a particle size of 0.6 micrometer or greater.

Pollizotti et al., (U.S. Pat. No. 4,851,041) disclose a WC—Co powder produced by reduction decomposition of a suitable mixed metal coordination compound such as tris (ethylenediaminecobalt) tungstate resulting in an atomically mixed high surface area reactive intermediate product, followed by carburization reduction of the intermediate product in flowing $CO/CO_2$ gas. The WC—Co mixed powder is described as being composed of multiphase composite particles which are larger aggregates containing WC grains (particles) having a size of 10 to 20 nm in a matrix of beta-Co/W/C solid solution.

S. Takatsu in *Powder Metallurgy International*, Vol. 10, No. 1, pages 13–15, 1978, discloses a method to produce WC powder by reducing a mixed oxide of W and Co by reducing and carburizing with gaseous reagents using a rotary kiln. The mixed oxide is first reduced to metal in a hydrogen atmosphere, then carburized in a methane hydrogen gas mixture, and finally further treated in hydrogen or a methane-hydrogen gas mixture to remove excess carbon and convert $W_3Co_3C$ to WC and Co. A homogeneous WC—Co mixed powder is disclosed having a mean particle size of greater than or equal to about 0.4 micrometer.

It is desirable to provide a metallic carbide-metal powder and process to manufacture said powder wherein the powder has a particle size less than about 0.4 micrometer.

SUMMARY OF THE INVENTION

A first aspect of the present invention is a method for preparing a transition metal carbide-Group VIII metal powder, the method comprises:
  heating an admixture comprising:
    a finishing source of carbon,
    a Group VIII powder source of iron, cobalt, nickel or mixture thereof and
    particulate precursor comprised of a metal containing tungsten and a precursor carbide comprising a carbide of a transition metal selected from the group consisting of: tungsten; titanium; tantalum; molybdenum; zirconium; hafnium; vanadium; niobium; chromium and mixture thereof,
to a temperature of from about 1173 K to about 1773 K under a hydrogen-containing atmosphere for a time sufficient to form the transition metal carbide-Group VIII metal powder wherein at least 25% by weight of the precursor carbide is carburized and the transition metal carbide-Group VIII metal powder contains an amount of Group VIII metal of at least about 0.25% to at most about 50% by weight of the transition metal carbide-Group VIII metal powder.

A second aspect of the invention is a method for preparing a transition metal carbide-Group VIII metal powder, the method comprises:
  heating an admixture comprising:
    a finishing source of carbon,
    a Group VIII powder source of iron, cobalt, nickel or mixture thereof and
    a particulate precursor comprised of a precursor carbide comprising a carbide of a transition metal selected from the group consisting of: titanium; tantalum; molybdenum; zirconium; hafnium; vanadium; niobium; chromium and mixture thereof,
a temperature of from about 1173 K to about 1773 K under a hydrogen-containing atmosphere for a time sufficient to form the transition metal carbide-Group VIII metal powder wherein at least 25% by weight of the precursor carbide is carburized and the transition metal carbide-Group VIII metal powder contains an amount of Group VIII metal of at least about 0.25% to at most about 50% by weight of the transition metal carbide-Group VIII metal powder.

A third aspect of the invention is a transition metal carbide-Group VIII metal powder comprising a mixture having particles of a transition metal carbide and Group VIII metal wherein:

at least 50% by number of the particles are discrete, the particles have at most an average aspect ratio of about 1.5, substantially all of the particles have a size of at most 0.4 micrometer, the transition metal carbide is a carbide selected from the group consisting of tungsten, titanium, tantalum, molybdenum, zirconium, hafnium, vanadium, niobium, chromium, and solid solution thereof, the Group VIII metal is selected from the group consisting of iron, cobalt, nickel and solid solution thereof and the transition metal carbide-Group VIII metal powder contains an amount of Group VIII metal of at least about 0.25% to at most about 50% by weight of the transition metal carbide-Group VIII metal powder.

A transition metal carbide-metal powder produced by a method described herein is useful to make coatings and sintered bodies displaying high hardness and good wear resistance properties. Suitable applications of said coatings and bodies include, for example, drill bits, blast nozzles, dies, punches and knives.

DETAILED DESCRIPTION OF THE INVENTION

The first and second aspects of the invention are methods for preparing a transition metal carbide-Group VIII metal powder. The method comprises heating an admixture comprised of a finishing source of carbon, a source of Group VIII metal and a particulate precursor to a temperature from about 1173 K to about 1773 K under a hydrogen containing atmosphere for a time sufficient to form a transition metal carbide Group VIII metal powder, wherein at least about 25% by weight of the precursor carbide is carburized in forming the transition metal carbide of the transition metal carbide-Group VIII metal powder. Herein, a Group VIII metal is iron, cobalt, nickel or mixture thereof. The carburization of the precursor carbide is believed to play a role in the formation of powder product having a small particle size.

Suitable Group VIII metal sources include metals, solid solution metals, oxygen containing compounds (e.g., an oxide), nitrides and carbides of Ni, Co and Fe. Other suitable Group VIII metal sources include solid solution metals and carbide alloys of the aforementioned Group VIII metals and a transition metal selected from the group consisting of: tungsten; titanium; tantalum; molybdenum; zirconium; hafnium; vanadium; niobium; chromium and mixture thereof. Preferably the source of the Group VIII metal powder is an oxide. The average particle size of the powder is preferably less than about 20 micrometers, more preferably less than about 10 micrometers, and most preferably less than about 5 micrometers to preferably greater than about 0.5 micrometer.

The admixture desirably contains an amount of Group VIII metal source sufficient to make a transition metal carbide-Group VIII metal powder having a concentration of Group VIII metal of at least about 0.25% by weight of said powder. Preferably the amount of group VIII metal source is sufficient to produce a transition metal carbide-Group VIII metal powder having a Group VIII metal concentration of at least about 0.5%, more preferably at least about 1%, and most preferably at least about 2% to preferably at most about 50%, more preferably at most about 30%, even more preferably at most about 20% and most preferably at most about 15% by weight of the transition metal carbide-Group VIII metal powder produced.

The finishing source of carbon, in the admixture, is a separately added carbon, residual carbon from the formation of the particulate precursor or mixture thereof. The separately added carbon suitably includes those described hereinafter for a reducing source of carbon. Preferably the separately added carbon is a solid particulate carbon. More preferably the separately added carbon is a carbon black and most preferably acetylene black.

The finishing source of carbon is preferably present in an amount which results in a transition metal carbide-Group VIII metal powder having minimal or no free carbon after heating (reacting) the admixture. The amount of carbon advantageously ranges from 60% to 120% of the stoichiometric amount. The stoichiometric amount of carbon is the amount of carbon which would react with the oxygen to form carbon monoxide (i.e., reduction reaction) in the particulate precursor (e.g., $WO_x$), and Group VIII metal source (e.g., $CO_3O_4$) and also carburize the transition metal compounds (e.g., W, $W_2C$, $WO_x$) in the particulate precursor to a carbide of desired stoichiometry (e.g., WC) in the absence of another reducing agent such as hydrogen, wherein "x" represents the amount of oxygen in the particulate precursor as determined by combustion analysis. When carbon is used in excess of the stoichiometric amount, a product containing little or no free carbon can still be formed due to the loss of carbon from reaction with hydrogen (e.g., formation of methane).

The Particulate Precursor

Particulate precursor of the first aspect:

In the first aspect, the particulate precursor is comprised of a metal containing tungsten and a precursor carbide. The metal containing tungsten is suitably tungsten or a solid solution of tungsten and a transition metal selected from the group consisting of titanium; tantalum; molybdenum; zirconium; hafnium; vanadium; niobium; chromium and mixture thereof. The tungsten containing metal is suitably present in the particulate precursor in an amount of at least about 5% by weight of said precursor. The amount is preferably at least about 10%, more preferably at least about 20%, and most preferably at least about 30% to preferably less than about 90% by weight of the particulate precursor.

The precursor carbide is suitably a transition metal carbide such as a carbide of Ti, W, Ta, V, Hf, Nb, Zr, Mo and Cr, wherein the valence of the transition metal is 2, 3 or 4 and the valence of the carbon is −4. For example, the carbide is preferably WC, $W_2C$, or mixture thereof, when forming a monotungsten carbide-Group VIII metal powder and specifically when forming a monotungsten carbide-cobalt powder. The precursor carbide is also suitably a solid solution transition metal carbide such as $(W,Ti,Ta)_xC$; $(Ti,Ta)_xC$; $(W,Ti)_xC$ or $(W,Ta)_xC$ wherein "x" is 1 to 2. Desirably at least about 25% by weight of the precursor carbide is comprised of a transition metal carbide, wherein the valence of the transition metal in said carbide is lower than the valence of the transition metal in the following carbides: monotungsten carbide (WC), monotitanium carbide (TiC), monotantalum carbide (TaC), monovanadium carbide (VC), monohafnium carbide (HfC), mononiobium carbide (NbC), monozirconium carbide (ZrC), dimolybdenum carbide ($Mo_2C$), trichromium dicarbide ($Cr_3C_2$) or solid solutions thereof. More preferably the amount of lower valence carbide is at least about 30%, and even more preferably at least 40%, and most preferably at least about 50% by weight of precursor carbide.

The precursor carbide is desirably present in the particulate precursor in an amount of at least about 20% by weight of the particulate precursor. Preferably the amount is at least 30%, more preferably at least 35%, and most preferably at least about 50% to preferably at most about 90% by weight of the particulate precursor.

The particulate precursor may also contain a Group VIII metal which is typically in a reduced form. For example, the Group VIII metal can be in the form of a metal, a metal in a metal solid solution, a carbide or a carbide alloy such as $Co_6W_6C$ and $Co_2W_4C$ when forming, for example, a WC—Co powder. The particulate precursor can also contain free carbon. The free carbon generally is a residue from the formation of the particulate precursor described hereinafter.

In a preferred embodiment of the first aspect of the invention in which WC-cobalt metal powder is formed, the particulate precursor desirably consists of tungsten, ditungsten carbide and monotungsten carbide. The tungsten is typically present in an amount of from about 25 to about 70 weight percent, more typically from about 40 to about 60 weight percent; ditungsten carbide is typically present in an amount of from about 25 to about 70 weight percent, more typically from about 40 to about 60 weight percent and monotungsten carbide is typically present in an amount of from about 5 to about 50 weight percent, more typically from about 15 to about 40 weight percent, based on the weight of the particulate precursor.

To minimize or avoid formation of water vapor which may cause unwanted particle growth during heating (reacting) of the admixture, the particulate precursor preferably has an oxygen content of less than about 2.5, more preferably less than about 2, and most preferably less than about 1% by weight of the particulate precursor. To facilitate the production of a transition metal carbide-Group VIII metal powder having a small size, the particulate precursor desirably has a particle size that is less than or equal to about 1.0 micrometer in diameter. Said particles are preferably at most about 0.5, more preferably at most about 0.4 micrometer, and most preferably at most about 0.2 micrometer to preferably at least about 0.01, more preferably at least about 0.02, and most preferably at least about 0.05 micrometer in diameter.

Particulate precursor of the second aspect:

The particulate precursor of the second aspect of the invention is comprised of a precursor carbide of a transition metal selected from the group consisting of: titanium; tantalum; molybdenum; zirconium; hafnium; vanadium; niobium; chromium and mixture thereof, wherein the stoichiometery of the particulate precursor is the same as described for the first aspect.

The precursor carbide of the second aspect is the same as the precursor carbide of the first aspect, except that the precursor carbide of the second aspect does not contain tungsten. That is to say, said precursor carbide does not contain a metal or carbide containing tungsten.

The precursor carbide can comprise all of the particulate precursor but: preferably is present in an amount less than 100% to an amount greater than about 50% by weight of the particulate precursor. For example, it is preferred that a transition metal(s) selected from the group consisting of: titanium; tantalum; molybdenum; zirconium; hafnium; vanadium; niobium; chromium and mixture thereof is present in an amount from about 1 to about 50% by weight of the particulate precursor. Said transition metal(s) can also be a solid solution metal of the aforementioned metals. The particulate precursor of this aspect of the invention may also contain a group VIII metal and free carbon as described for the particulate precursor of the first aspect. In addition, the particulate precursor of this aspect of the invention preferably has an oxygen and particle size as described hereinabove for the first aspect of the particulate precursor.

Forming the Particulate Precursor

The particulate precursor can be formed by any convenient method such as reduction by carbon and/or hydrogen and carburization of an oxygen containing transition metal compound, wherein the transition metal of the compound is tungsten, titanium, tantalum, molybdenum, zirconium, hafnium, vanadium, niobium, chromium or a mixture thereof. Herein, reduction is the removal of oxygen from a compound and carburization is described hereinafter. Preferably said transition metal compound is a transition metal oxide, acid (e.g., tungstic acid) or ammonium compound (e.g., ammonium paratungstate). For preparing solid solution metallic carbides, the transition metal oxide may be the oxide or oxides of more than one of the transition metals listed above. The source of the oxides or oxides of at least two transition metals may include separate oxide powders of the two transition metals or a single multimetallic alloy oxide containing two or more of the transition metals. The transition metal oxide is preferably the simple oxide of the metal, such as tungsten trioxide ($WO_3$), titanium dioxide ($TiO_2$) and tantalum pentoxide ($Ta_2O_5$).

A desirable source of tungsten oxide has particles which are less than or equal to 25 micrometers in diameter. A preferred particulate, $WO_3$, of this size is sold by GTE Products Corporation under the trade name "TO-3". Materials such as metatungstic acid, ammonium paratungstate or other tungsten oxides can be used in place of $WO_3$. "TITANOX™" from Velsicol Chemical Corporation, Chicago, Ill., is a preferred source of $TiO_2$. "TITANOX" is a trademark for Velsicol's series of white pigments comprising $TiO_2$ in both anatase and rutile crystalline forms. Some "TITANOX" series pigments are extended with calcium sulfate, but these extended pigments are not preferred for use in the present invention. A preferred source of $Ta_2O_5$ is of less than 325 mesh (45 micrometers) size and greater than 99% purity, sold by Aldrich Chemical Company, Milwaukee, Wis. The oxides of the other metals should be of comparable purity and particle size.

Preferably the particulate precursor is formed by heating the aforementioned transition metal compound with a reducing source of carbon to a temperature for a time under an atmosphere that is non-oxidizing and free of hydrogen sufficient to reduce the transition metal compound into the particulate precursor. The temperature is a temperature where the formation of the desired transition metal carbide is thermodynamically favored.

The reducing source of carbon is preferably a particulate carbon material such as carbon black or acetylene black. A particularly preferred acetylene carbon black is commercially available from Chevron Chemical under the trade designation "SHAWINIGAN". However, it is contemplated that other carbon solid sources would also be suitable. In addition, other sources of carbon such as organic polymers, carbohydrates and hydrocarbons may be useful in place of all or part of a particulate carbon material. Carbon black having a specific surface area of about 30 to about 90 m2/g has been found to be suitable for the invention.

The reducing source of carbon is used in an amount sufficient to form the particulate precursor described hereinabove. The amount of carbon is desirably an amount ranging from 60% to 120% by weight of the stoichiometric amount, the stoichiometeric amount being similar to the stoichiometeric amount for the particulate precursor previously described. That is to say, the stoichiometric amount of carbon is the amount of carbon which would react with the oxygen to form carbon monoxide (i.e., reduction reaction) in the oxygen containing compound (e.g., $WO_3$), and Group VIII metal source if present (e.g., $Co_3O_4$) and also carburize the transition metal compounds (e.g., $WO_3$) to a carbide of desired stoichiometry (e.g., WC) in the absence of another reducing agent such as hydrogen.

A source of a Group VIII metal (i.e., Fe, Co, and Ni) can also be admixed, heated and reduced along with the oxygen containing transition metal compound. A suitable Group VIII metal source and amount of said source is the same as those previously described. Preferably the source is an oxide of the Group VIII metal (e.g., NiO or $Co_3O_4$).

The temperature is desirably equal to a temperature where the formation of the transition metal carbide having desired stoichiometry is thermodynamically favorable (i.e., the free energy of the reaction to form said carbide is negative). The reaction temperature must also be less than the melting point of any intended reaction product(s). For mono tungsten carbide, a reaction temperature of at least 1273 K is considered beneficial, while temperatures of from 1673 K to 2673 K are preferred, and temperatures of from 1823 K to 2673 K are Tore preferred. When a heating rate of 10,000 K to 100,000,000 K per second is employed, via the entrainment method discussed herein below, a reaction temperature of 1873 to 2423 K is satisfactory. Approximate minimum temperatures at which the free energy of formation of the following specific reaction products is less than the free energy of formation of components of the finishing mixture needed to form the reaction products are as follows: tungsten carbide (WC) 950 K; titanium carbide (TiC) 1555 K; tantalum carbide (TaC) 1381 K; vanadium carbide (VC) 932 K; hafnium carbide (HfC) 1934 K; niobium carbide (NbC) 1228 K; zirconium carbide (ZrC) 1930 K; dimolybdenum carbide ($Mo_2C$) 742 K and trichromium dicarbide ($Cr_3C_2$) 1383 K.

The time at the reaction temperature during the reduction depends in part upon the heating rate and reaction temperature, but must be high enough to reduce at least a major portion (i.e., desirably greater than about 90% by weight) of the transition metal compound containing oxygen. The time is preferably in the range of about 0.1 second to ½ hour, depending upon the heating method, heating rate, reaction temperature and the ultimate particle size desired. Whatever combination of reaction temperature, reaction time and heating rate is selected, however, it should be adequate to convert said transition metal compound containing oxygen into the particulate precursor described previously.

The particulate precursor is preferably prepared by the rapid carbothermal reduction method described below and described in more detail in U.S. Pat. No. 5,380,688, incorporated herein by reference.

In preparing the particulate precursor by the method described by the '688 patent, an amount of reducing carbon (e.g., acetylene black) is mixed with a transition metal compound containing oxygen (e.g., $WO_3$). The amount of carbon used is the same as described before. An amount of a group VIII metal (e.g., $Co_3O_4$) source can also be mixed with said carbon and transition metal compound. The reactants (e.g., $WO_3$, C and, optionally, $Co_3O_4$) can be mixed by any convenient technique such as V-blenders, jet mills and ball mills, the latter containing a suitable milling media such as tungsten carbide-cobalt milling media.

The reactants are then heated advantageously at a rate of 100 to 100,000,000 K/sec in a non-oxidizing atmosphere (i.e., rapid carbothermal reduction). Generally, the heating rate for heating the reactants from room temperature to the reaction temperature is preferably at least on the order of 100 to 10,000 K per second and optimally on the order of 10,000 to 100,000,000 K per second.

The rapid carbothermal reduction can be performed by a drop or entrainment method as described in the '688 patent. In the drop method, the hot zone of an induction furnace is brought to the desired reaction temperature, as described further hereinbelow, and allowed to equilibrate for 30 minutes under a flowing non-oxidizing gaseous atmosphere such as argon. Aliquots of the reactants (e.g., $WO_3$, C and, optionally, $Co_3O_4$) are dropped into a graphite crucible in the hot zone of the furnace. The extent of reaction is monitored by measuring the reaction by-product carbon monoxide level in the crucible as a function of time. When the carbon monoxide level decreases back to its baseline value, it is assumed that the reaction is over. After the reaction is assumed to be over, the crucible and reactant products are cooled as rapidly as possible back to a temperature, such as room temperature, sufficient to minimize particle agglomeration and grain growth.

It has been determined that the rates of heating in this drop method are from about 100 K per second to about 10,000 K per second. In the drop method, typical preferred residence times are from about 5 minutes to 2 hours for a reaction temperature of 1773 K with a heating rate of about 100 to 10,000 K per second.

The rapid carbothermal process can be carried out by the entrainment method as described in U.S. Pat. No. 5,380,688. The entrainment method involves the use of a vertical graphite tube reaction furnace which is disclosed in U.S. Pat. No. 5,110,565, incorporated herein by reference. The reactants are placed into a feed hopper, which allows flowing non-oxidizing gas, such as argon, to entrain the mixture and deliver it to the furnace's reaction chamber as a dust cloud. The powder or particulate mixture is immediately heated in the reaction chamber at rates of between about 10,000 to 100,000,000 K per second, while the average residence time of the particulate in the furnace is on the order of seconds. In the entrainment method, a residence time of from about 0.2 to 10 seconds for a reaction temperature of 1823 K or above with a heating rate of about 10,000 to 100,000,000 K per second is preferred. At the higher heating rate, residence times substantially greater than 10 seconds may undesirably produce sintered aggregates rather than particulate product. As for exiting the hot zone of the reaction chamber, the flowing gas carries the powder into a water-cooled stainless steel jacket which rapidly cools reacted powder below 283 K. The entrainment method is the preferred method, as it has been shown to produce smaller size particulates than the drop method.

It is believed that reaction temperature, residence time and heating rate of the above methods are the main parameters controlling the size of the particles of the particulate precursor obtained. They do so by affecting both the nucleation rate for forming the metal and metal carbide particles and the growth rate of these particles once formed. For example, presuming that the particles are roughly spherical and the conversion of starting material to product occurs at a relatively constant volume rate, the growth rate of the particles should be proportional to the cube root of the residence time. In order to minimize the particle size of the resulting particulate precursor, the reaction temperature, heating rate and residence time should be selected to yield a particle nucleation rate which is higher than, and preferably significantly higher than, the particle growth rate.

Forming the Transition Metal Carbide-Group VIII Metal Powder

To form a transition metal carbide-Group VIII metal powder, an admixture of the particulate precursor, Group VIII metal powder source and finishing source of carbon is heated to a temperature of from about 1173 K to about 1773 K under a hydrogen-containing atmosphere for a time sufficient to form a transition metal carbide-Group VIII metal powder, wherein at least 25% by weight of the particulate precursor is carburized to form the transition metal carbide-Group VIII metal powder. Said heating and subsequent carburization is referred to, hereinafter, as finishing or finishing reaction. The admixture of particulate precursor, Group VIII metal source and finishing carbon is referred to, hereinafter, as the finishing mixture.

During finishing, carburization of the precursor carbide occurs. Carburization, herein, is the chemical bonding of carbon to another element such as a carbon species reacting with a transition metal forming a carbide (e.g., W+C=WC or $W_2C$) and carbon species reacting with a transition metal of a carbide, subsequently, forming a carbide wherein the transition metal has a higher valence (e.g., $W_2C+C=WC$). During finishing, reduction by hydrogen and/or carbon (e.g., $WO_3+3H_2=W+3H_2O$; $WO_3+3C=W+3CO$) may also occur. Elimination of carbon may also occur by the reaction with hydrogen to form, for example, methane. Preferably at least two of the above-described reactions occur during finishing. More preferably all of the above reactions occur during finishing.

Mixing to form the finishing mixture may be done by any convenient mixing techniques such as those described previously, ribbon blenders, roller mills, vertical screw mixers and fluidized zone mixers such as those sold under the trade designation "FORBERG".

The finishing mixture can be static or moving during the finishing reaction. Preferably the finishing reaction is carried out by tumbling the finishing mixture in a rotary graphite crucible reactor. Other apparatus suitable for imparting motion to the finishing mixture during heating include a rotary calciner, fluidized bed and vibrating fluidized bed. The heating of the finishing mixture can be carried out in a number of ways, for example, by induction heating of the rotary graphite crucible.

The hydrogen-containing atmosphere advantageously contains at least about 1 mole percent hydrogen with the balance being an inert gas such as argon. An atmosphere containing from about 3 to about 7 mole percent hydrogen in argon is particularly suitable. It is preferred that the atmosphere be a flowing atmosphere in order to carry away the gaseous by-products such as carbon monoxide and water vapor.

The temperature Of reaction during the finishing reaction is typically from about 900° C. (1173 K) to about 1450° C. (1723 K). The temperature of the reaction may be used to manipulate the particle size of the product wherein a higher temperature generally leads to a product having a larger particle size. The finishing step is, typically conducted for a period of time from about 10 minutes to about 2 hours. The lower the temperature that is used to carry out the finishing reaction, the longer the time will be to form the transition metal carbide-Group VIII metal powder.

The Transition Metal Carbide-Group VIII Metal Powder Formed

The finishing step is conducted until the finishing mixture forms a product which is at least 95% by weight a transition metal carbide-Group VIII metal powder. More preferably the product is at least about 98% by weight a transition metal carbide-Group VIII metal powder. Most preferably the product is at least about 99 percent by weight transition metal carbide-Group VIII metal powder. Impurities may be present in the transition metal carbide-Group VIII metal powder such as elemental transition metal, free carbon or transition metal-Group VIII-carbon alloys such as $Co_6W_6C$ and $Co_2W_4C$. The powder desirably contains very little free carbon such as less than about 0.2% of the total powder weight. Preferably the free carbon is at most about 0.15%, more preferably at most about 0.1%, and most preferably at most 0.05% by weight of the total powder. Preferably, the amount of transition metal and alloy impurity is below the powder X-ray diffraction detection limit as described in *Elements of X-ray Diffraction*, B. D. Cullity, Addison-Wesley, Reading Mass., 1956, relevant portions incorporated herein by reference.

The transition metal carbide-Group VIII metal formed by the aforementioned methods are comprised of substantially discrete particles of a transition metal carbide and discrete particles of a Group VIII metal, wherein substantially means at least about 50% of the particles by number are discrete particles. A particle is discrete when it is unconnected to any other particle. Preferably the number of particles that are discrete is greater than about 60, more preferably greater than about 75, even more preferably greater than about 90, and most preferably greater than about 95% by number. Said particles are uniformly and intimately mixed in the transition metal carbide-Group VIII metal powder. The amount of particles that are discrete can be determined directly by electron microscopy.

Generally, the particles of the transition metal-Group VIII metal powder are equiaxed. Herein, equiaxed describes particles having an average aspect ratio of at most about 1.5 wherein the aspect ratio is the ratio between the longest and shortest dimension of a particle as measured by electron microscopy. Preferably the average aspect ratio is at most about 1.2. Said particles desirably have a particle size in which substantially all of the particles are at most about 0.4 micrometer in diameter. Preferably substantially all of the particles are at most 0.3 and more preferably are at most 0.2 micrometer in diameter. Said particles also preferably have a particle size in which substantially all of the particles are at least about 0.01, more preferably at least about 0.05, and most preferably at least about 0.1 micrometer in diameter. The aforementioned aspect ratio and particle size can be determined by direct measurement of a number of particles using electron microscopy. Substantially all, as just used herein, equates to at least about 95% by number of the particles falling within the specified sizes. It is also preferred that essentially all of the particles fall within the just specified particle sizes. Essentially all, as just used herein, equates to at least about 99% by number of the particles falling within the specified particle sizes.

The transition metal carbide of the powder is selected from carbides of the group consisting of tungsten, titanium, tantalum, molybdenum, zirconium, hafnium, vanadium, niobium, chromium, solid solutions thereof and mixtures thereof. Preferably the transition metal carbide is monotungsten carbide (WC), WC containing solid solution such as WC—TiC—TaC or mixture thereof. Most preferably the transition metal carbide is monotungsten carbide.

In a preferred embodiment, the powder is WC-cobalt powder having a particle size of at most about 0.4 micrometer in diameter and a cobalt concentration of at least about 1% by weight of the powder. Said powder is also preferred to have a particle size of greater than about 0.1 micrometer in diameter. Said powder is even more preferred to have a particle size of at most about 0.2 micrometer in diameter.

The following examples are illustrative only and should not be construed as limiting the invention in any way.

EXAMPLES

In the following examples, reference to "trace concentrations" equates to less than 5 weight percent; reference to "minor concentrations" equates to from 5 to less than 25 weight percent and reference to "major concentrations" equates to at least 25 weight percent.

The particle sizes in the following examples are crystallite mean number diameters measured from approximately 100 particles in random 50,000× scanning electron microscopy images.

Example 1

A tungsten carbide-containing particulate precursor is prepared using the entrainment method described above, wherein the temperature of the reaction is held at 1550° C. (1823 K), the atmosphere is argon, the reaction time is about 2 to 4 seconds, the heating rate is about 10,000 to 100,000,000 K/sec and the reactive particulate mixture consists of 84.7 parts by weight of TO-3, ($WO_3$) and 15.3 parts by weight of Chevron acetylene black, as the source of carbon. 250 Grams of the resulting particulate precursor is homogenized in a 1-liter urethane-lined ball mill with 5 millimeter WC—Co milling media for 30 minutes, sieved through a 30-mesh screen, milled again for an additional 30 minutes and sieved again through a 30-mesh screen. The homogenized particulate precursor contains 1.29 weight percent of carbon and 4.12 weight percent of oxygen as measured by a combustion technique using apparatus manufactured by Leco Corporation (St. Joseph, Mich.).

86.1 Parts by weight (pbw) of the particulate precursor, 3.6 ppw of Chevron acetylene black and 10.3 ppw of $Co_3O_4$ (#22, 164-3 from Aldrich Chemicals, Milwaukee, Wis.) are milled together using the same milling procedure described for the homogenization of the particulate precursor to form a finishing mixture. The finishing mixture is formulated to obtain a product that has a weight ratio of WC/Co of 92/8 which corresponds to a carbon concentration of a bout 5.64% by weight.

50 Grams of the finishing mixture are placed in a quartz boat and the boat is placed in a tube furnace for conducting a finishing reaction. The finishing reaction is conducted at 1100° C. (1373 K) for 120 minutes in a flowing atmosphere of 5 mole percent hydrogen in argon. The product from the finishing reaction contains WC and Co as shown by X-ray diffraction. The oxygen and carbon contents in the final WC—Co product are, respectively, 0.14 weight percent and 5.68 weight percent as measured by combustion analysis. 5.68 Weight percent is about the same carbon concentration as stoichiometeric amount desired. Scanning electron microscopic analysis of the product indicates that the average particle size is about 0.1 micrometer.

Example 2

Example 1 is repeated except the finishing mixture consists of 86.6 parts by weight of the particulate precursor, 3.0 parts by weight of carbon, and 10.3 parts by weight of $Co_3O_4$ and the finishing temperature is 950° C. (1373 K). The formulation for the finishing mixture is based on forming a product having a WC/Co weight ratio of 92/8. The finished product has oxygen and carbon contents of 0.29 weight percent and 5.70 weight percent, respectively, an average particle size of about 0.1 micrometer, a major concentration of WC and a minor concentration of Co.

Example 3

Example 2 is duplicated except that the time for the finishing reaction is 12 minutes. The oxygen and carbon levels in the finished product are 0.16 and 5.82 weight percent, respectively. X-ray diffraction analysis indicated that the final product had a major concentration of WC and a minor concentration of Co.

Example 4

In Example 4, the desired product is WC, WC—TiC—TaC solid solution and cobalt metal powder wherein the chemical composition of the powder as a whole has a molar ratio of 8(WC):1(WC—TiC—TaC):1(Co). In the absence of any free carbon, the desired powder product has a carbon concentration of about 7.2% by weight. The solid solution contains about equal weights of the carbides. That is to say, the molar formula for the solid solution is approximately (WC-3.25(TiC)—TaC).

Tungsten trioxide (Scopino Yellow Oxide obtained from TACOW Trade Consultants, Ltd. Hockessin, Del.), tantalum pentoxide (Zhuzhou-Grade FTa205, also obtained from TACOW Trade Consultants, Ltd.), titanium dioxide (Kronos K3020, obtained from Matteson-Ridolfi, Riverview, Mich.) and carbon black (Chevron Acetylene Black) are mixed by ball milling. The resultant reactant mixture contains 14.78 kg $WO_3$, 1.79 kg $Ta_2O_5$, 2.08 kg $TiO_2$ and 3.95 kg carbon black and is balled-milled for one hour in a 40-gallon ball mill that contains 400 lbs. of 0.5-inch (12.7 mm) diameter WC-6% Co milling media. After ball milling, said mixture is passed through a coarse (8 mesh, 2.36 mm) screen to remove the milling media.

Twenty-two (22) kg of said mixture are loaded into a feed hopper of a vertical graphite tube reaction furnace of the type disclosed in U.S. Pat. Nos. 5,110,565 and 5,380,688. The furnace tube is 3.35 meters long and has a 15.2 centimeter inside diameter. The feed hopper is connected to a cooled reactant transport member of the furnace by a twin screw loss-in-weight feeder. The reactant transport member has an inside diameter of 1.3 cm and is maintained at a temperature of approximately 283 K by water flowing through a cooling jacket. After the mixture is loaded into the feed hopper, the furnace tube is brought to a temperature of 2083 K in about 30 minutes as measured by optical pyrometers viewing the outside wall of the reaction chamber of the furnace tube. Argon gas flows into the reactant transport member at a rate of 3 scfm (85.05 slm).

The reactant mixture is then fed from the feed hopper into the cooled reactant transport member at a rate of 10 kg per hour (22 lbs per hour) by the twin screw feeder. The flowing argon gas entrains the particulate mixture and delivers it to the reaction chamber as a dust cloud. The particulate mixture is immediately heated in the reaction chamber at a rate of approximately 10,000 to 100,000,000 K per second causing a carbothermal reduction reaction to occur. The average residence time of said mixture in the furnace is between 3 and 4 seconds.

After exiting the reaction chamber, the flowing argon and carbon monoxide (which is generated during the carbothermal reduction reaction) gas mixtures carry the particulate precursor into a water-cooled stainless steel jacket that rapidly cools the precursor below 283 K. After exiting the reactor, the precursor is collected in a plastic bag that is placed in a stainless steel drum. The precursor is homogenized using a ball mill as described in Example 1. The homogenized precursor contains 2.39 weight percent oxygen and 6.78 weight percent carbon.

A finishing mixture containing 87.1 parts by weight of the precursor, 3.0 parts by weight carbon, and 9.9 parts by weight $Co_3O_4$ is made using the same milling procedure described in Example 1.

50 Grams of the finishing mixture are placed into a graphite tray and the tray is placed into a graphite furnace for conducting the finishing reaction. The finishing reaction is conducted at 1350° C. (1423 K) for 60 minutes in a flowing atmosphere of 5 mole percent hydrogen in argon. The product from the finishing reaction contains WC, a cubic solid solution WC—TiC—TaC carbide and Co as determined by X-ray diffraction. The oxygen and carbon contents in the final product are 0.19 weight percent and 6.60 weight percent, respectively. Scanning electron microscopy of the product indicates that the particle size is about 0.3 micrometer. The product has a carbon concentration which is less than stoichiometeric (about 7.2% by weight).

Example 5

In Examples 5–7, the desired product is WC, WC—TiC—TaC solid solution and Ni metal powder wherein the chemical composition of the powder as a whole has a molar ratio of 8(WC):1(WC—TiC—TaC):1(Ni). In the absence of any free carbon, the desired powder product has a carbon concentration of about 7.2% by weight. The solid solution contains about equal weights of the carbides. That is to say, the molar formula for the solid solution is approximately (WC-3.25(TiC)—TaC).

Example 4 is duplicated except that the finishing mixture contains 88.0 parts by weight of the precursor, 2.5 parts by weight carbon, and 9.5 parts by weight NiO and the finishing temperature is 1250° C. (1523 K).

The product contains WC, Ni and WC—TiC—TaC solid solution as determined by X-ray diffraction. The oxygen content is 0.95% by weight and the carbon content is 7.05% by weight. The carbon content is nearly the desired stoichiometeric amount (about 7.2% by weight). The particle size is about 0.1 to 0.2 micrometer.

Example 6

Example 5 is repeated except that the finishing mixture contains 87.5 parts by weight of the precursor, 3.0 parts by weight carbon and 9.5 parts by weight NiO.

The product contains WC, Ni and WC—TiC—TaC solid solution as determined by X-ray diffraction. The oxygen content is 0.70% by weight and the carbon content is 7.34% by weight. The carbon content is nearly the desired stoichiometeric amount (about 7.2% by weight). The particle size is about 0.1 to 0.2 micrometer.

Example 7

Example 6 is repeated except that the finishing reaction temperature is 1350° C. (1623 K).

The product contains WC, Ni and WC—TiC—TaC solid solution as determined by X-ray diffraction. The oxygen content is 0.15% by weight and the carbon content is 6.90% by weight. The carbon content is below the desired stoichiometeric amount (about 7.2% by weight). The particle size is about 0.2 micrometer. For all of the above examples, the carbon concentration of the product is adjustable by the amount of carbon in the finishing mixture, temperature of the reaction and, to a lesser extent, by the time of the reaction. The optimum reaction parameters are empirically determinable.

What is claimed is:

1. A transition metal carbide-Group VIII metal powder comprising a mixture having particles of a transition metal carbide and Group VIII metal wherein:

at least 50% by number of the particles are discrete, the particles have at most an average aspect ratio of about 1.5, substantially all of the particles have a size of between 0.1 and 0.4 micrometer, the transition metal carbide is a carbide selected from the group consisting of tungsten, titanium, tantalum, molybdenum, zirconium, hafnium, vanadium, niobium, chromium and solid solution thereof, the Group VIII metal is selected from the group consisting of iron, cobalt, nickel and solid solution thereof and the transition metal carbide-Group VIII metal powder contains an amount of Group VIII metal of at least about 0.25% to at most about 50% by weight of the transition metal carbide-Group VIII metal powder.

2. The transition metal carbide-Group VIII metal powder of claim 1 wherein said powder is a monotungsten carbide-cobalt powder.

3. The transition metal carbide-Group VIII metal powder of claim 2 wherein the monotungsten carbide-cobalt powder has a cobalt concentration of at least about 1% by weight of the powder.

4. The transition metal carbide-Group VIII metal powder of claim 1 wherein the size is at most about 0.2 micrometer in diameter.

5. The transition metal carbide-Group VIII metal powder of claim 1 wherein said powder contains a free carbon amount that is at most about 0.2% by weight of the powder.

* * * * *